April 20, 1948.  J. H. KROOSS  2,439,979
PIPE COUPLING
Filed July 27, 1945  2 Sheets-Sheet 1

INVENTOR
John H. Krooss,
BY
Barry & Cyr  ATTORNEYS

April 20, 1948. J. H. KROOSS 2,439,979
PIPE COUPLING
Filed July 27, 1945  2 Sheets-Sheet 2
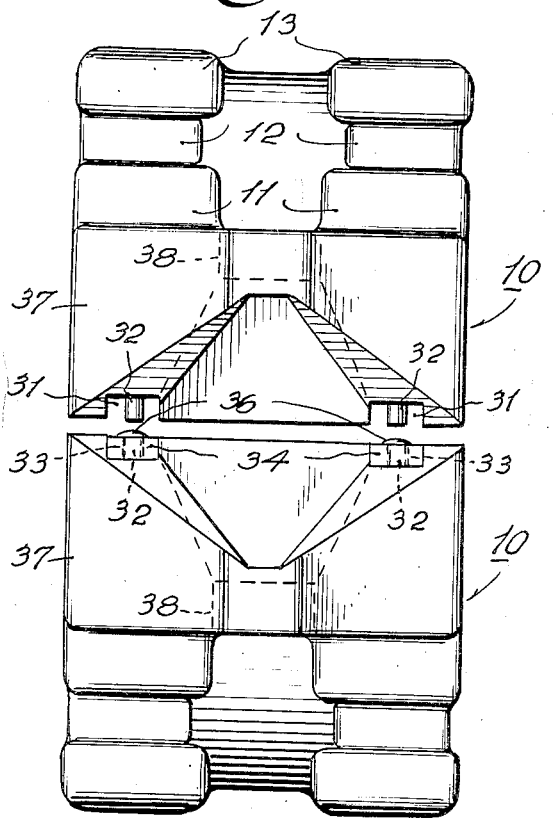
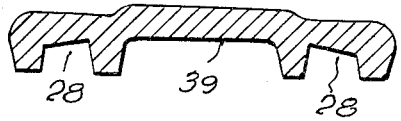
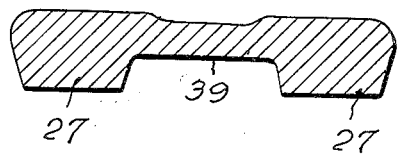
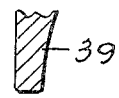
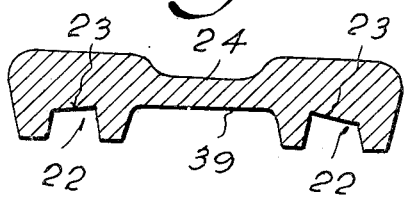
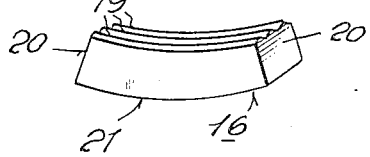
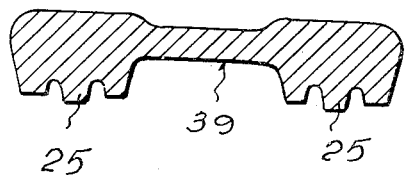
INVENTOR
John H. Krooss,
BY
Barry & Cyr
ATTORNEYS Patented Apr. 20, 1948

2,439,979

UNITED STATES PATENT OFFICE 2,439,979

PIPE COUPLING

John H. Krooss, New York, N. Y., assignor to Pipe Couplings, Inc., New York, N. Y., a corporation of New York Application July 27, 1945, Serial No. 607,387

10 Claims. (Cl. 285—194)

This invention relates to improvements in pipe couplings of the split-housing type and more particularly to couplings of this type designed for use with plain end pipes.

One of the objects of the invention is to provide a coupling of light-weight, strong construction so designed as to permit the use of gripping jaws without any liability of weakening the coupling housing at the places where the jaws are positioned.

Another object is to supply a coupling housing especially designed to facilitate the attachment of gripping jaws.

A still further object is to supply a coupling with novel means for securing gripping jaws to end portions of the housing segments.

With the above objects outlined and with other objects in view which will appear as the description progresses, the invention consists in the novel features hereinafter described in detail, illustrated in the accompanying drawings and more particularly pointed out in the appended claims.

In the drawings:

Fig. 3 is a side elevation taken at right angles to the one shown in Fig. 2.

Figure 2:
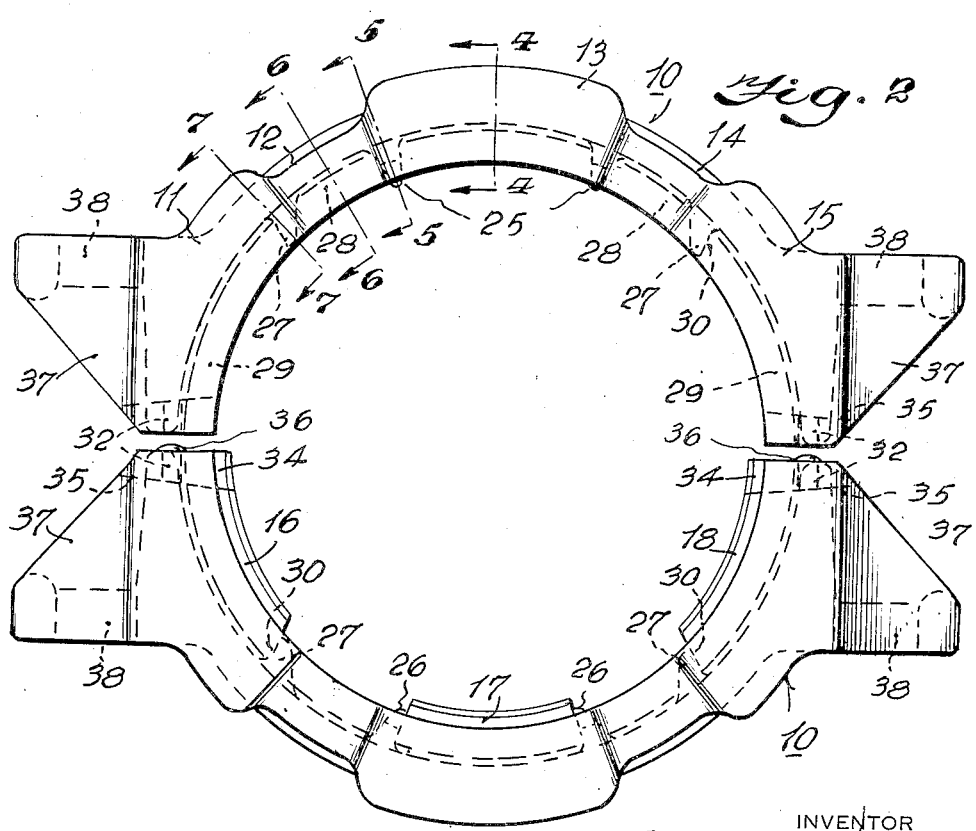
Fig. 2 is a side elevation with the jaw shown attached to the bottom segment only.

Figs. 4, 5, 6 and 7 are radial sectional views of details taken on the lines 4—4, 5—5, 6—6 and 7—7 of Fig. 2.

Figure 1:
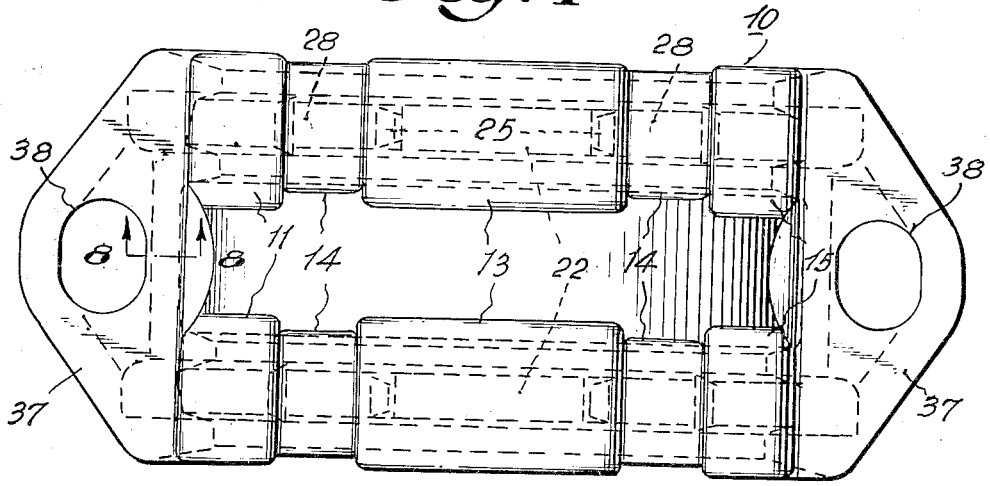
Fig. 1 is a plan view of the improved coupling with the gripping jaws and connecting bolts omitted.

Fig. 8 is a sectional view of another detail on the line 8—8 of Fig. 1.

Fig. 9 is a perspective view of one of the toothed jaws.

Referring to the drawings, 10 designates substantially semicircular housing members, each preferably formed of malleable cast iron, cast and pressed within specified limits without machining, although they may be made of other metal, such as steel or brass, or even plastics. Only one pattern is required for both housing members.

As it is desirable that the housing be as light as possible while retaining the required strength, I preferably make each housing member with alternate thick and thin portions, as indicated at 11, 12, 13, 14, and 15. The thickened portions allow for grooving to receive gripping jaws 16, 17 and 18 of hard metal, and each jaw as shown in Fig. 9 is of segmental shape with teeth 19 at its inner side. The ends 20 converge toward the toothed surface, and the outer surface is inclined at 21, for wedging purposes, as will be hereinafter explained.

From Fig. 4 it will be observed that each housing member is provided intermediate its ends with oppositely disposed grooves 22 for the reception of a pair of jaws 17, and the bottoms 23 of the grooves converge toward the medial portion 24 of said member. As shown in Figs. 2 and 5, the ends of each groove 23 are provided with lugs 25 which originally are shaped as shown at the upper portion of Fig. 2, but which are peened against the ends of the jaws 17, as indicated at 26 in the lower half of Fig. 2 for the purpose of securing the jaw in position. At this point it will be noted that the surface 21 of the jaw contacts the surface 23 of the housing, and therefore the jaws when gripping pipes, are wedged more tightly into engagement with the pipes when the pipes are moved in opposite directions away from the housing.

The housing member is also provided with a pair of stationary lugs 27 between the lugs 25 and the ends of the housing member, and for lightening the structure between the lugs 25 and 27, other grooves 28 may be arranged between these lugs in alignment with the grooves 22 (see Fig. 6).

A third set of grooves 29 is provided between the lugs 27 and the ends of the member, and it will be noted that the inner ends 30 of these grooves are inclined to accord with the inclined ends of the jaws, and therefore when a jaw 16, 18 is placed in contact with a lug 27 and secured in this position, the jaw will be locked in place. To accomplish such locking, the ends of the housing are provided with pairs of cavities 31, interrupted by pins 32 arranged substantially perpendicular to a diameter of the housing, and adapted to enter holes 33 in retaining plates 34 which impinge against the outer ends of the jaws 16, 18. At this point it will be noted that the bottom surfaces 35 of the cavities converge relatively to the surfaces 30 of the lugs 27, and consequently when the plates 34 are placed in position and the ends of the pins are peened, as indicated at 36, the plates will function to secure the jaws 16, 18 in position. Of course, the surfaces of the grooves 29 which engage the outer surfaces 21 of the jaws, are inclined in the same manner, as illustrated in Fig. 4, so the jaws 16, 18 will be tightened on the pipes when the pipes are pulled away from the housing.

The ends of each housing member terminate in ears 37, having apertures 38 for the reception of bolts (not shown).

Each segment of the housing is provided with a wide groove 39 intermediate the side portions of the member and extending from end to end thereof, for the reception of a conventional sealing gasket (not shown).

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

What I claim and desire to secure by Letters Patent is:

1. A pipe coupling of the character described comprising an arcuate housing member of segmental shape and varying in cross-sectional thickness circumferentially of the coupling, thicker portions of said member being provided with grooves, arcuate toothed jaws slidably mounted in said grooves for movement axially of the coupling, the jaws in the grooves being spaced from one another and each jaw having a plurality of parallel teeth at the inner side thereof, the edge of each tooth of the jaw being the same distance from the axis of the coupling throughout the circumferential length of the tooth, and means for locking the jaws to the housing member to prevent movement of the jaws circumferentially of the coupling.

2. A pipe coupling of the character described comprising an arcuate housing member of segmental shape and varying in cross-sectional thickness circumferentially of the coupling, thicker portions of said member being provided with grooves, arcuate toothed jaws slidably mounted in said grooves for movement axially of the coupling, the jaws in the grooves being spaced from one another and each jaw having a plurality of parallel teeth at the inner side thereof, the edge of each tooth of the jaw being the same distance from the axis of the coupling throughout the circumferential length of the tooth, and means for locking the jaws to the housing member to prevent movement of the jaws circumferentially of the coupling, the last-mentioned means including peened portions of the housing member.

3. A pipe coupling of the character described, comprising a housing member of segmental shape having an internal groove at one end thereof, extending circumferentially of the member, a jaw arranged in the groove, a plate engaging one end of the jaw for holding it in the groove, and means integral with the housing member for rigidly securing the plate to the member.

4. A pipe coupling of the character described, comprising a housing member of segmental shape and provided with an internal groove at one end thereof, extending circumferentially of the member, a jaw extending into the groove and having gripping teeth arranged at the inner periphery of said member, and means at the ends of the jaw for securing the jaw to the member, said means comprising a plate extending substantially radially of the housing, and means integral with the housing member for rigidly securing the plate to said member.

5. A pipe coupling as claimed in claim 4 in which the surface of the jaw opposite its toothed surface is inclined, and a surface of the groove has a complementary incline cooperating therewith for urging the jaw toward the axis of the coupling when the jaw is moved axially of the housing member in one direction.

6. A pipe coupling as claimed in claim 4 in which the plate is apertured and the housing is provided with a pin which extends through the plate aperture.

7. A pipe coupling of the character described, comprising a housing member of segmental shape provided with aligned circumferential grooves at the inner periphery thereof, one of said grooves being arranged intermediate the ends of the member, a jaw occupying the last-mentioned groove and secured to the housing member, other toothed jaws occupying the other grooves, and plates secured to the ends of the member, engaging ends of the last-mentioned jaws and securing said jaws to the housing member.

8. A pipe coupling of the character described, comprising a housing member of segmental shape provided with aligned circumferential grooves at the inner periphery thereof, one of said grooves being arranged intermediate the ends of the member, a jaw occupying the last-mentioned groove and secured to the housing member, other toothed jaws occupying the other grooves, and plates secured to the ends of the member, engaging ends of the last-mentioned jaws and securing said jaws to the housing member, and means for moving all of said jaws toward the axis of the coupling when the jaws are moved axially of the coupling in one direction.

9. A pipe coupling of the character described, comprising a metallic housing member of segmental shape provided with an internal groove extending circumferentially of the member and arranged at one end portion thereof, a toothed jaw extending into the groove and having teeth positioned at the inner periphery of said member, and means engaging the ends of the jaw and securing it to the member, said means comprising a plate arranged at one end of the member, extending substantially radially of the coupling and provided with an aperture, and a pin integral with the member, extending through said aperture and having a peened end securing the plate to the pin.

10. A pipe coupling of the character described comprising a pair of semi-circular metallic housing members, each provided with a plurality of internal grooves extending substantially from end to end thereof, a jaw occupying the medial portion of each groove, means integral with each housing member for securing the jaws of that member against movement in the groove circumferentially of the coupling, other toothed jaws occupying the grooves of each member and arranged between the first-mentioned jaws of that member and the ends thereof, each jaw having at the inner side thereof a plurality of arcuate parallel teeth extending from end to end of the jaw, plates arranged at the ends of each housing member for securing certain of the jaws in the grooves, means integral with each housing member for rigidly securing the plates thereof in position, and means for moving all of said jaws toward the axis of the coupling when the jaws are moved axially of the coupling.

JOHN H. KROOSS.

REFERENCES CITED

The following references are of record in the file of this patent:

UNITED STATES PATENTS

| Number | Name | Date |
|---|---|---|
| 2,005,056 | Stephens | June 18, 1935 |

FOREIGN PATENTS

| Number | Country | Date |
|---|---|---|
| 443,375 | Great Britain | Feb. 27, 1936 |